United States Patent
Gillis et al.

(10) Patent No.: US 6,831,802 B1
(45) Date of Patent: Dec. 14, 2004

(54) METHODS AND APPARATUS FOR THERMALLY BONDING LUBRICANT TO A DISK SURFACE BY THE REPETITIVE WRITING OF DATA

(75) Inventors: Donald Ray Gillis, San Jose, CA (US); Andrei Khurshudov, San Jose, CA (US)

(73) Assignee: Hitachi Global Storage Technologies, Amsterdam (NL)

(*) Notice: Subject to any disclaimer, the term of this patent is extended or adjusted under 35 U.S.C. 154(b) by 0 days.

(21) Appl. No.: 10/675,357

(22) Filed: Sep. 30, 2003

(51) Int. Cl.$^7$ .............................. G11B 21/02; G11B 5/82
(52) U.S. Cl. ..................... 360/75; 360/135; 427/557; 427/548; 428/65.4
(58) Field of Search ............................ 360/55, 75, 59, 360/97.01, 135, 230, 137, 97.02; 427/131, 130, 557, 532, 545, 548; 428/65.3, 65.4, 65.8, 694 BP; 204/298.01, 192.1, 298.02

(56) References Cited

U.S. PATENT DOCUMENTS

| | | | | |
|---|---|---|---|---|
| 3,719,525 A | * | 3/1973 | Patel et al. | 148/246 |
| 4,626,941 A | | 12/1986 | Sawada et al. | |
| 4,692,832 A | | 9/1987 | Bandara et al. | |
| 5,049,410 A | | 9/1991 | Johary et al. | |
| 5,331,487 A | | 7/1994 | Gregory et al. | |
| 5,396,383 A | | 3/1995 | Gregory et al. | |
| 5,436,776 A | | 7/1995 | Kurokawa | |
| 5,820,945 A | * | 10/1998 | Wei et al. | 427/555 |
| 5,825,591 A | | 10/1998 | Nakamura et al. | |
| 6,356,405 B1 | | 3/2002 | Gui et al. | |
| 6,417,981 B1 | | 7/2002 | Smith | |
| 2002/0135922 A1 | | 9/2002 | Smith | |
| 2003/0067711 A1 | | 4/2003 | Shoda et al. | |

FOREIGN PATENT DOCUMENTS

| | | |
|---|---|---|
| DE | 3341205 | 5/1984 |
| JP | 60133538 | 7/1985 |
| JP | 63257976 | 10/1988 |
| JP | 2206010 | 8/1990 |
| JP | 4149819 | 5/1992 |
| JP | 4345915 | 12/1992 |
| JP | 8203066 | 8/1996 |

OTHER PUBLICATIONS

IBM Technical Disclosure Bulletin, Method of Prolonging the Life of Magnetic Disk Storages, Jun. 1998, p. 247.

* cited by examiner

Primary Examiner—Andrew L. Sniezek
(74) Attorney, Agent, or Firm—John J. Oskorep, Esq.

(57) ABSTRACT

A method of thermally bonding lubricant over a surface of a magnetic disk in a disk drive involves providing a heat source at an air bearing surface (ABS) of a magnetic head; causing the heat source to be energized to produce heat; and causing the magnetic head to be moved across a surface portion of a magnetic disk so that lubricant is thermally bonded over the surface portion from the heat produced by the heat source. Preferably, this lubricant bonding mode of operation is performed on a regular or periodic basis. Alternatively, the mode is activated based on a predetermined environmental condition (e.g. temperature or humidity) or from an external signal. In one example, the heat source is comprised of first and/or second pole pieces of the magnetic head through which an electrical current is passed. In another example, the heat source is comprised of a separate heating element which is formed on or within the magnetic head (which may be the same heating element utilized for thermal-assist writing to the magnetic disk). In yet another example, heat for thermally bonding lubricant is generated by reading data from a data block on the magnetic disk and writing the data back to the data block in a repetitive fashion.

30 Claims, 6 Drawing Sheets

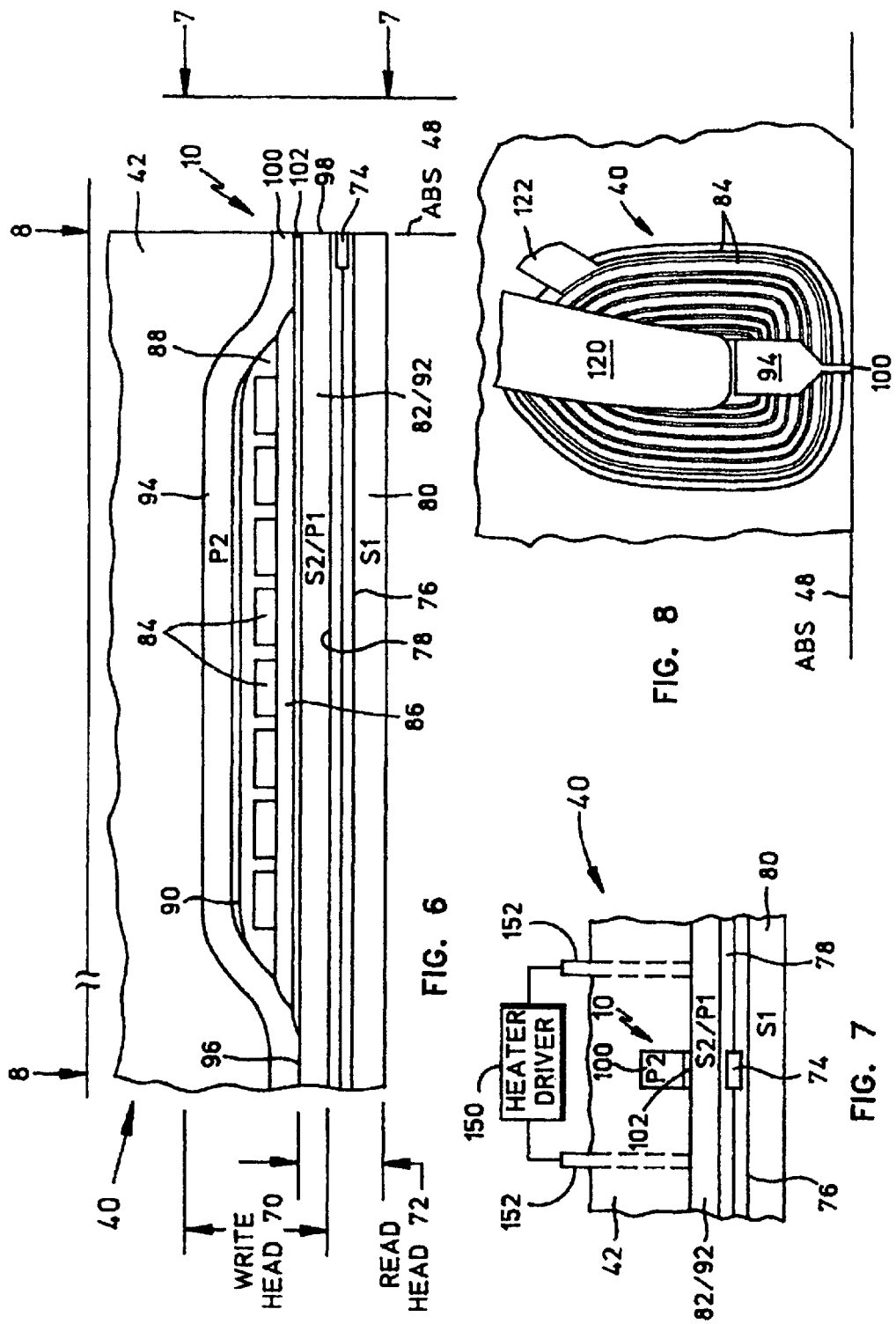

METHODS AND APPARATUS FOR THERMALLY BONDING LUBRICANT TO A DISK SURFACE BY THE REPETITIVE WRITING OF DATA

BACKGROUND OF THE INVENTION

1. Field of the Invention

This invention relates generally to disks and disk drives, and more particularly to methods and apparatus for thermally bonding lubricant to a disk with use of a heat source at an air bearing surface (ABS) of a magnetic head.

2. Description of the Related Art

A write head is typically combined with a magnetoresistive (MR) or giant magnetoresistive (GMR) read head to form a magnetic recording head, certain elements of which are exposed at an air bearing surface (ABS). The write head comprises first and second pole pieces connected at a back gap that is recessed from the ABS. The first and second pole pieces terminate at the ABS where they define first and second pole tips, respectively. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces magnetic write fields in the first and second pole pieces.

A non-magnetic gap layer is sandwiched between the first and second pole tips. Write fields of the first and second pole tips at the ABS "fringe" across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR or GMR read head.

One or more heads may be employed in a magnetic disk drive for reading and writing information on circular tracks of a rotating disk. A magnetic recording head is mounted on a slider that is carried on a suspension. The suspension is mounted to an actuator which places the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (i.e. its fly height) from the surface of the disk.

It is generally desirable to minimize the fly height of a magnetic head. With lower fly heights between the magnetic head and the disk, however, there is an increasing rate of intermittent contacts between the head and the disk. This may result in damage to the disk surface. To mitigate these problems, lubricants are often coated on the disk surface during manufacturing. After the disk surface is coated with the lubricant, it is typically heated in an oven to help "bond" the lubricant to the disk surface. This bond may be made through physical absorption such that the lubricant attaches to carbon on the disk surface. After this process, a large amount of the lubricant (e.g. close to 100%) may be bonded to the disk surface.

In time, however, some of the lubricant will debond from the disk surface depending on particular environmental conditions such as humidity. The debonding process creates what may be generally referred to as "mobile" lubricant. After such debonding, there may be between 20–50% mobile lubricant on the disk surface. Mobile lubricant is indeed mobile and moves across the disk surface, creating differences in lubricant thickness from the inner diameter (ID) to the outer diameter (OD) of the disk. In particular, air shear forces due to disk rotation and interaction with the slider push the mobile lubricant from the ID to the OD, creating a much thicker lubricant at the OD than the ID. Eventually, the excess mobile lubricant may be spun off of the disk surface and become too thin or depleted on the disk surface to be effective.

Thus, although the disk is coated and bonded with lubricant during manufacture to protect it from the intermittent contact with the head, the lubricant may be depleted from the disk surface during operation of the drive. Because of these problems, several types of lubricant reservoir systems have been disclosed as a means for continuously maintaining a lubricant film on the disk during operation. Use of such lubricant reservoirs, however, may provide too much mobile lubricant than needed. If the mobile lubricant becomes too thick on the disk surface, it may cause oscillating write errors or oscillating thermal erasures. If the excess mobile lubricant is spun off the disk surface, the lubricant may be picked up by the slider and there may be an undesirable slider-to-disk bridging.

Accordingly, what are needed are improved methods and apparatus for bonding lubricants to the surfaces of magnetic disks.

SUMMARY

A method of bonding lubricant to a surface of a magnetic disk in a disk drive involves providing a heat source at an air bearing surface (ABS) of a magnetic head; causing the heat source to be energized to produce heat; and causing the magnetic head to be moved across a surface portion of a magnetic disk so that lubricant is thermally bonded to the surface portion from the heat provided by the heat source. Preferably, this lubricant bonding mode of operation of the disk drive is performed on a regular or periodic basis. Alternatively, the mode is activated based on a predetermined environmental condition (e.g. temperature or humidity) or an external signal.

In a first embodiment, the heat source is comprised of first and/or second pole pieces of the magnetic head through which an electrical current is passed. In a second embodiment, the heat source is comprised of a separate heating element which is formed on or within the magnetic head. In this second embodiment, the heating element may be the same heating element that is utilized for thermal-assist writing to the magnetic disk. In a third embodiment, heat is generated by reading data from a data block on the disk and writing the data back to the data block in a repetitive fashion.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
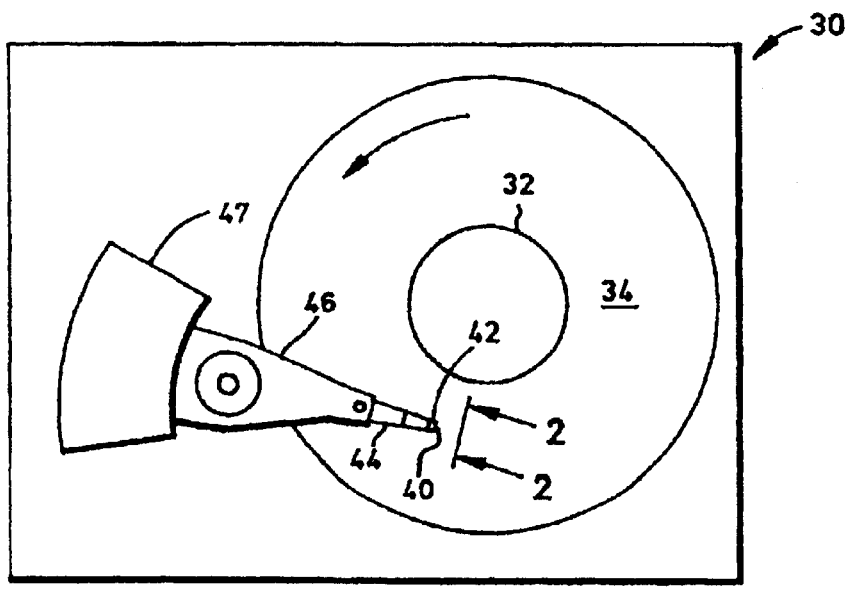
FIG. 1 is a plan view of an exemplary magnetic disk drive.
Figure 2:
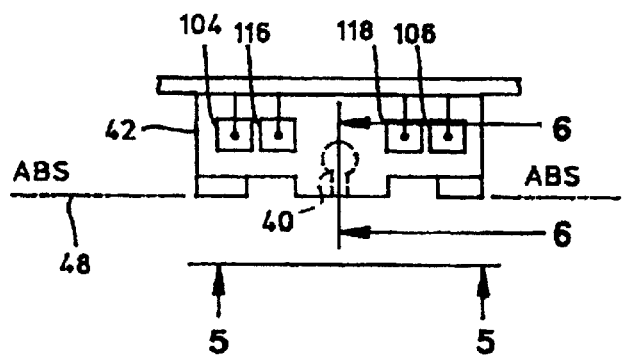
FIG. 2 is an end view of a slider with a magnetic head of the disk drive as seen in plane 2—2 of FIG. 1.
Figure 3:
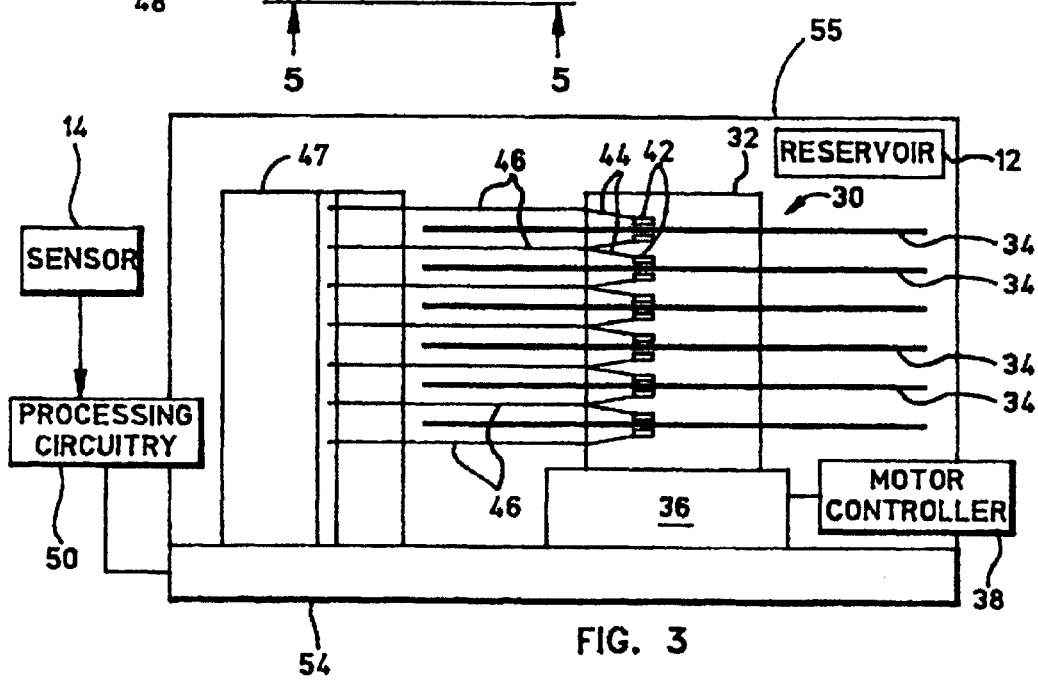
FIG. 3 is an elevation view of the magnetic disk drive wherein multiple disks and magnetic heads are employed.
Figure 4:
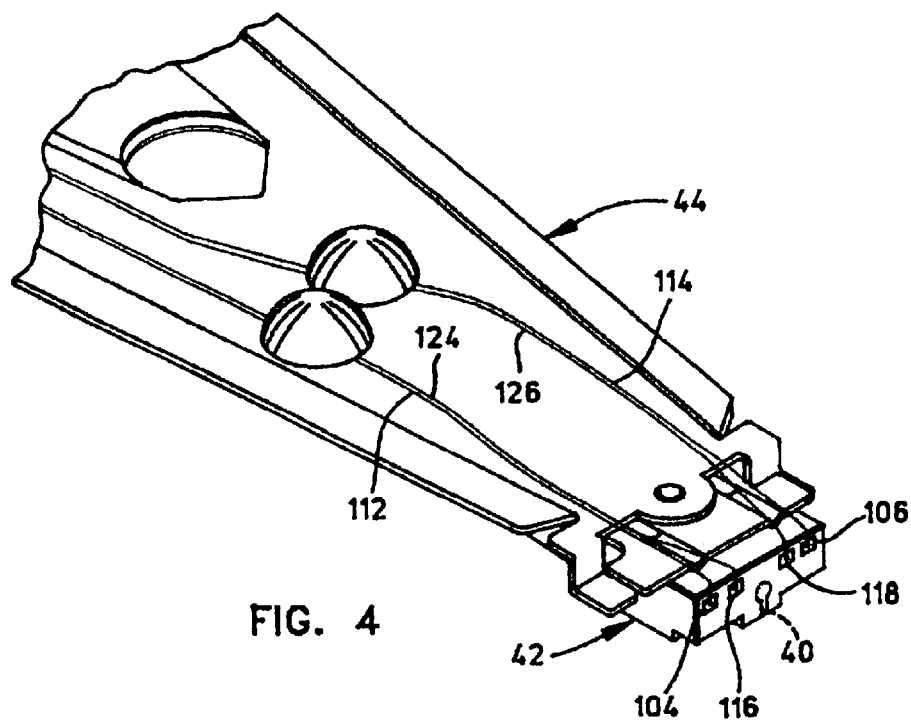
FIG. 4 is an isometric illustration of an exemplary suspension system for supporting the slider and magnetic head.
Figure 5:
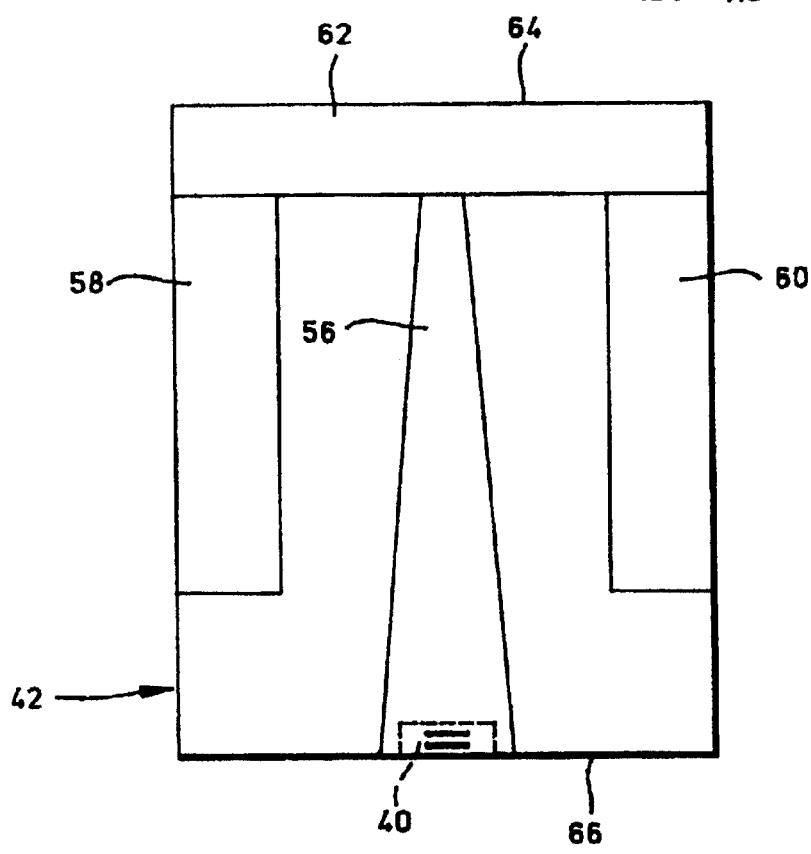
FIG. 5 is an ABS view of the magnetic head taken along plane 5—5 of FIG. 2.

Magnetic Disk Drive. Referring now to the drawings wherein like reference numerals designate like or similar parts throughout the several views, FIGS. 1–3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically 5–10 nm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a spin valve sensor 74 of the present invention. FIG. 7 is an ABS view of FIG. 6. Spin valve sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of spin valve sensor 74 changes. A sense current 1, conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

According to the present application, magnetic head 40 also includes a heat source for thermally bonding lubricant to a surface of disks in disk drive 30. This heat source may be referred to as a lubricant bonding heat source. Preferably, the heat source is provided at ABS 48 of magnetic head 40. At an appropriate time, the heat source is energized to produce heat and magnetic head 40 is moved across a surface portion of magnetic disk 34 so that the lubricant is thermally bonded to the surface portion from the heat produced by the heat source.

Heat Source Comprised of One or More Pole Pieces of the Magnetic Head. In a first embodiment, the heat source is comprised of first and/or second pole pieces of magnetic head 40. In FIGS. 6 and 7, for example, first and/or second pole pieces 92 and 94 of write head 70 form a heat source 10 for thermal bonding lubricant to disk 34. Electrical current is provided through first and/or second pole pieces 92 and 94 which raises the temperature at pole tips 98 and 100. The electrical current may be provided from a heater driver circuit 150 (visible in FIG. 7 only) which is coupled to first and/or second pole pieces 92 and 94 through electrical connections 152 (visible in FIG. 7 only) formed through magnetic head 40. In the example of FIG. 7, it is shown that electrical connections 152 are specifically coupled to first pole piece 92. Electrical connections 150 may be made of a conductive material, such as platinum or an alloy of nickel.

Heater driver circuit 150 may include conventional circuitry such as CMOS logic devices, bi-polar devices, and amplifiers. As specific examples, heater driver circuit 150 may utilize an alternating current (AC) circuit or a bimodal current driver to avoid electron migration and device degradation. On the other hand, direct current (DC) may be provided to drive heat source 10. In alternative embodiments, a pre-existing circuit of the disk drive is utilized as the heater driver circuit 150 to reduce the need for additional circuitry. As an example, heater driver circuit 150 may be a secondary use of the write coil driver which drives a supply current to heat source 10. As another example, the heat source may be connected to disk motor 36 or motor controller 38 of FIG. 3. This disk motor can serve as a current or voltage source that drives the heater if the power requirements are substantial. This assumes that the power of the heater is small (e.g. less than 10%) for the disk motor during operation. Preferably, heater driver circuit 150 is not exposed on the outside of magnetic head 40 but is contained at a location away therefrom. For example, heater driver circuit 150 may be included in the same area where arm electronics (AE) of disk drive 30 are located, or on the circuit board card attached to the base of disk drive 30.

Figure 9:
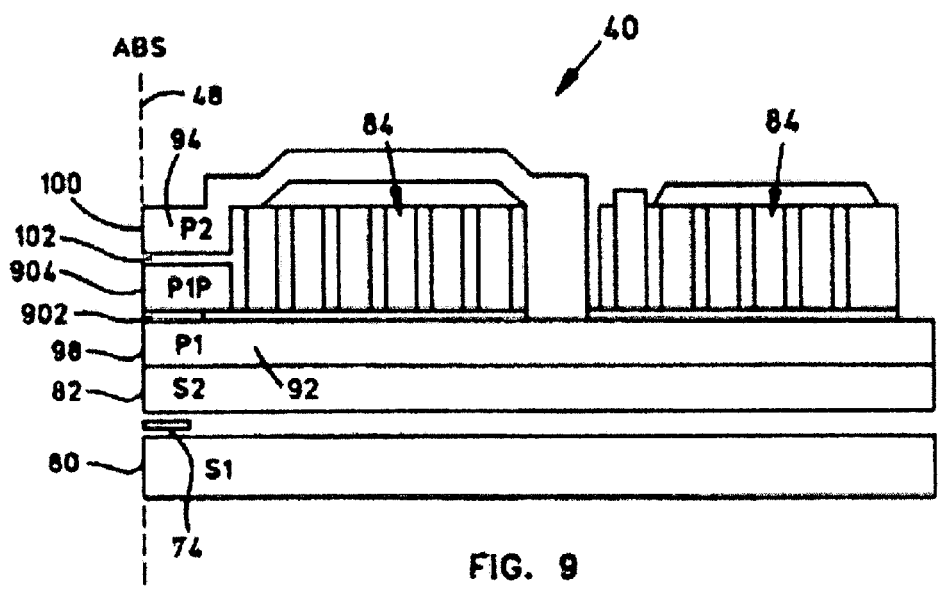
FIG. 9 is another partial view of the slider and a merged magnetic head in an alternate embodiment.
Figure 10:
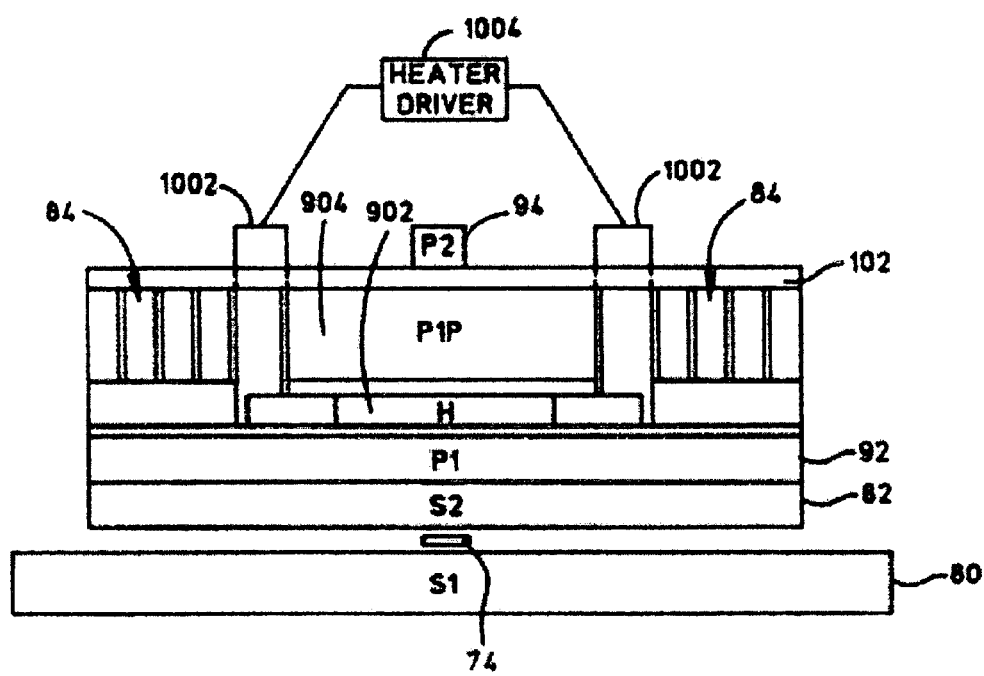
FIG. 10 is another partial ABS view of the slider in the alternate embodiment of FIG. 9.

Heat Source Comprised of Separate Heating Element in the Magnetic Head. In a second embodiment, the heat source is a separate heating element which is formed on or within magnetic head 40. Referring to FIGS. 9 and 10, a separate heating element 902 is shown formed within magnetic head 40. More specifically, heating element 902 is formed between first pole piece 92 and a first P1 pedestal 904 ("P1P"). Thin dielectric insulator materials (visible in FIG. 10 only) isolate heating element 902 from first pole piece 92 and first P1 pedestal 904. Preferably, heating element 902 is an electrically resistive heater (i.e. a resistive infared radiator) which rises in temperature when an electrical current flows through it. Heating element 902 is made of a suitable conductive material, preferably a metal or metal alloy, which may be formed within magnetic head 40 by conventional sputter deposition and etching techniques. For example, heating element 902 may be made of sputter-deposited tantalum. Alternatively, heating element 902 may be made of a NICHROME™ material which is basically an alloy of nickel and chromium. NICHROME™ is a registered trademark of the Driver-Harris Company.

Heating element 902 has a high resistance, preferably between about 25 and 250 ohms, which does not vary significantly when energized. When energized, heating element 902 heats up to a steady-state temperature of between about 25–250° Celsius. For example, heating element 902 may have a predetermined steady state temperature of 120° Celsius when data is being written. Also, the heating element may have a power dissipation of between about 10–140 milliwatts, or more particularly a power dissipation of about 70 milliwatts.

Electrical connections 1002 (FIG. 10 only) are for coupling heating element to a heater driver circuit 1004 (visible in FIG. 10 only). Electrical connections 1002 may also be made of a conductive material, such as platinum or an alloy of nickel. Heater driver circuit 1004 may include conventional circuitry such as CMOS logic devices, bi-polar devices, and amplifiers. As specific examples, heater driver circuit 1004 may utilize an alternating current (AC) circuit or a bimodal current driver to avoid electron migration and device degradation. On the other hand, direct current (DC) may be provided to drive heating element 902. In alternative embodiments, a pre-existing circuit of the disk drive is utilized as the heater driver circuit 1004 to reduce the need for additional circuitry. As an example, heater driver circuit 1004 may be a secondary use of the write coil driver which drives a supply current to heating element 902. As another example, heating element 902 may be connected to disk motor 36 or motor controller 38 of FIG. 3. This disk motor can serve as a current or voltage source that drives the heater if the power requirements are substantial. This assumes that the power of the heater is small (e.g. less than 10%) for the disk motor during operation. Preferably, heater driver circuit 1004 is not exposed on the outside of magnetic head 40 but is contained at a location away therefrom. For example, heater driver circuit 1004 may be included in the same area where arm electronics (AE) of disk drive 30 are located, or on the circuit board card attached to the base of disk drive 30.

Dual-Use Of Heating Element for Thermal-Assist Writing. Thermal-assist recording is a known technique for writing data to a magnetic disk having a high coercivity. In the present state-of-the-art, a conventional magnetic disk has a coercivity of between about 2000 and 4000 Oersteds at typical operating temperatures and can store between about 1 $Gb/in^2$ and 60 $Gb/in^2$ of data. On the other hand, disks utilized in connection with thermal-assist heating have relatively higher coercivities, between about 4000 and 10000 Oersteds at typical operating temperatures. These disks can store a larger amount of data, between about 80 $Gb/in^2$ and 500 $Gb/in^2$ of data. The basic relationship between media coercivity $H_C$ and temperature is that coercivity decreases as the temperature increases. For such a high coercivity disk to be written to, a writable portion of the disk is heated to lower its coercivity. For example, the disk may be heated to between about 80–300° Celsius to lower its coercivity to between about 2000 and 6000 Oersteds. Note that the coercivities and storage capacities just described are merely those which are suitable values at the present time and may change in the future.

In the present application, heating element 902 of FIG. 9 is not only used for thermally bonding lubricant to the disk but is also used to provide the heat to lower the disk's coercivity during the write mode of operation. Heating element 902 is positioned on magnetic head 40 such that it is aligned with pole tips so that heat can be thermally transferred to a writable portion of magnetic disk 34 before data is written to it. When energized, heating element 902 causes a portion of magnetic disk 34 to be heated through radiation or conduction (thermal contact) and it will remain at an elevated temperature when being written to. By heating up the disk portion, the bits therein are made writable such that magnetic head 40 can write data thereto. (Referring ahead to the flowchart of FIG. 12, heat source 902 of FIGS. 9–10 is utilized in a write mode of operation for thermal-assist writing to the disk in step 1208 and utilized in a lubricant bonding mode of operation for thermally bonding lubricant to the disk in step 1212.)

For thermal-assist writing, heating element 902 has the same construction as described above for lubricant bonding. The exact location of heating element 902 may vary, and it may be alternatively formed within magnetic head 40 where it is not exposed at ABS 48. Heating element 902 has a high resistance, preferably between about 25 and 250 ohms, which does not vary significantly when energized. When energized, heating element 902 heats up to a steady-state temperature of between about 80–400° Celsius. For example, heating element 902 may have a predetermined steady state temperature of 150° Celsius when data is being written. Also, the heating element may have a power dissipation of between about 5–20 milliwatts, or more particularly a power dissipation of about 10 milliwatts. Heater driver circuit 1004, described earlier above, may sufficiently drive heating element 902 as required.

Figure 11:
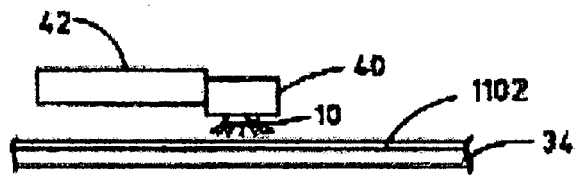
FIG. 11 is a simplified illustration of the magnetic head having a heat source for thermally bonding lubricant to a magnetic disk.

General Techniques of Thermal Lubricant Bonding in a Disk Drive. As described, magnetic head 40 includes a heat source for thermally bonding lubricant to a surface of disks in disk drive 30. This heat source may be referred to as a lubricant bonding heat source. Referring to FIG. 11, a simplified illustration of magnetic head 40 having heat source 10 at the ABS for thermally bonding a lubricant film 1102 to magnetic disk 34 is shown. Prior to employing heat source 10 to magnetic disk 34, lubricant 1102 may be referred to as "mobile" lubricant. At an appropriate time, heat source 10 is energized to produce heat and magnetic head 40 is moved across a surface portion of magnetic disk 34 so that lubricant 1102 is thermally bonded to the surface portion from the heat produced by heat source 10. In particular, the heat causes lubricant 1102 to attach to carbon on the surface of magnetic disk 34 through physical absorption. Once bonded, lubricant 1102 is no longer "mobile" but is indeed bonded to magnetic disk 34.

The lubricant 1102 utilized may be, as examples, ZDOL-2000, ZDOL-4000, ZTETRAOL-2000, A20H, etc. Preferably, lubricant 1102 of FIG. 11 is received and collected from a lubricant reservoir 12 in the disk drive of FIG. 3. Lubricant reservoir 12 continually supplies lubricant on magnetic disk 34. Continual conventional application of such lubricant tends to provide excessive mobile lubricant on the surface of disk 34. If the lubricant becomes too thick, it may cause oscillating write errors or oscillating thermal erasures. If the excess lubricant is spun off the surface of disk 34, the lubricant may be picked up by the slider which may cause an undesirable slider-to-disk bridging. With the thermal bonding techniques of the present application, however, this problem is alleviated if not eliminated. Lubricant which is continually provided from lubricant reservoir 12 is thermally bonded to disk 34 with use of the heat source as described.

Figure 12:
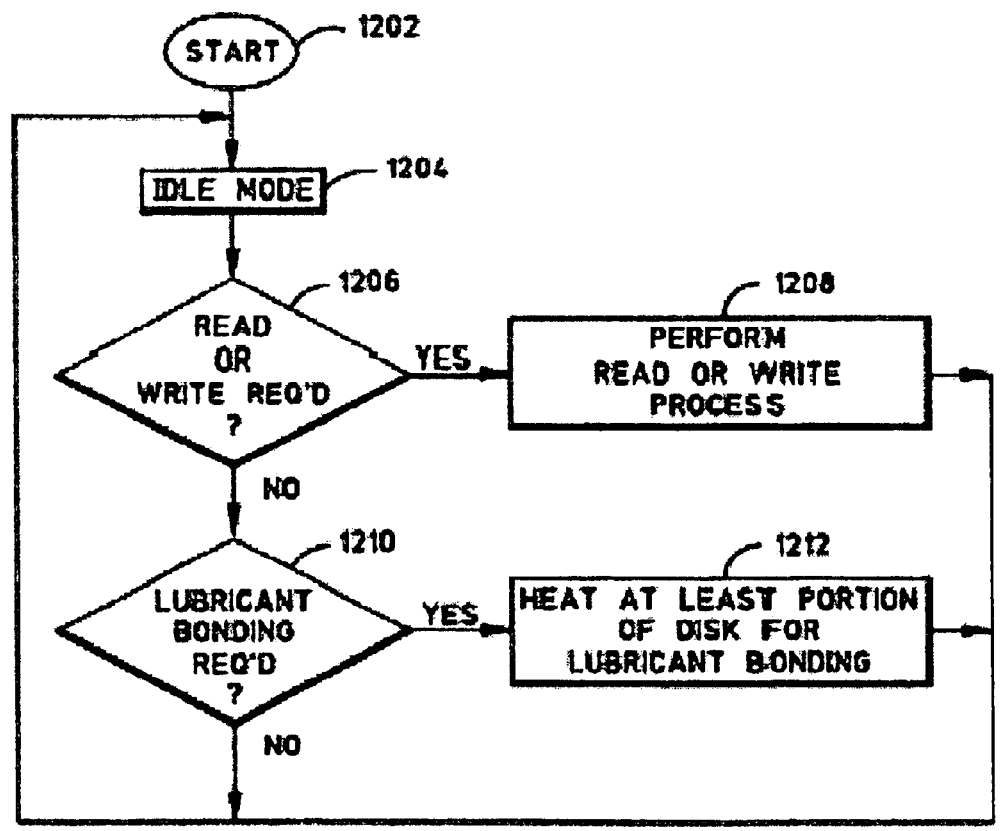
FIG. 12 is a flowchart which describes a general technique of operating a magnetic disk drive which includes a lubricant bonding mode of operation.

FIG. 12 is a flowchart which describes a technique of operating a magnetic disk drive which includes a lubricant bonding mode of operation. This technique is performed by processing circuitry in the disk drive which may include memory or a data storage medium (e.g. ROM, EEPROM, or Flash memory) for storing computer instructions which execute the technique with a controller or processor (e.g. a microprocessor). In the following description, FIG. 12 will be referred to in combination with FIG. 11.

Beginning at a start block 1202 of FIG. 12, a disk drive is in an idle mode of operation (step 1204) where little or no significant activity occurs (e.g. no reading or writing of data with magnetic head 40). If a read or write process is required at step 1206, then the disk drive causes magnetic head 40 to read or write data from or to magnetic disk 34 as is conventional (step 1208). This may be referred to as a read or write mode of operation of the disk drive. Once the read or write process is completed, the disk drive reverts back to the idle mode in step 1204.

If no read or write process is required at step 1206 of FIG. 12, the disk drive identifies whether lubricant bonding for disk 34 is required (step 1210). If lubricant bonding is required at step 1210, then the disk drive enters into a lubricant bonding mode of operation at step 1212. In the lubricant bonding mode of operation of step 1212, the disk drive causes heat source 10 to be energized to produce heat while magnetic head 40 is moved across at least a portion of the surface of magnetic disk 34. Heat source 10 is moved and applied continuously and evenly over the surface portion of disk 34. The heat produced by heat source 10 and the time over which it is applied over the surface portion of disk 34 is sufficient to thermally bond lubricant 1102 to the surface portion. In particular, the heat causes lubricant 1102 to attach to carbon on the disk surface through physical absorption. Once the lubricant bonding process is completed, the disk drive reverts back to the idle mode in step 1204 and the technique repeats.

Preferably, the lubricant bonding is performed over a substantial surface portion of magnetic disk 34. In one embodiment, the lubricant bonding process is performed over the entire surface area of disk 34. The entire surface may be bonded in a single lubricant bonding "sweep" or, alternatively, in a plurality of bonding "sweeps" performed at regular or periodic intervals (e.g. 2–20 sweeps which together bond the entire surface, each sweep occurring periodically, e.g. once per week or bimonthly). At a minimum, it is preferred that the lubricant bonding process be performed over at least 10% of the surface area of disk 34. For example, the surface area over which lubricant 1102 is bonded may include the inner diameter (ID) or the outer diameter (OD) of disk 34 (e.g. to cover at least 10% of the disk surface). Mobile lubricant 1102 tends to move across the disk surface from the ID to the OD due to air shear forces during disk rotation, creating a much thicker lubricant at the OD than the ID. Thus, it is advantageous to perform the thermal bonding process at least at the ID to retain lubricant.

The length of time it takes to perform the lubricant bonding depends on the size of the surface area of disk 34 to be bonded, the average temperature of heat source 10, and the average speed at which heat source 10 is moved across the disk 34. The average temperature of heat source 10 may vary from between about 25–250° Celsius. The average speed of heat source 10 may vary from between about 1–50 meters/second. It is preferable to maintain heat source 10 with a relatively low temperature of between about 85–120° with a speed of between about 1–50 meters/second.

As previously described, the disk drive identifies whether lubricant bonding is required in step 1210 of FIG. 12. It is desirable that any suitable event trigger this lubricant bonding process. In one embodiment, the bonding process is a time-triggered, regular or periodic process. For example, the bonding process may be invoked once every day, once every week, once every month, or once every year. Thus, the bonding process may be triggered in response to an expiration of a predetermined time period. In this case, processing circuitry (e.g. processing circuitry 50 of FIG. 3) utilizes a clocked timer to invoke the lubricant bonding process in a regular or periodic fashion. In another embodiment, the lubricant bonding process is triggered in response to a predetermined environmental condition. As examples, the bonding process may be invoked in response to a predetermined temperature or humidity condition. In this case, the disk drive may include one or more sensors such as a sensor 14 of FIG. 3 which is coupled to processing circuitry 50. Sensor 14 may be a temperature sensor or a humidity sensor. The condition which causes the triggering may be, for example, a humidity condition of greater than 50% relative humidity. In yet another embodiment, the lubricant bonding process is triggered in response to a predetermined signal from an external source. For example, the bonding process may be invoked in response to a user input or application on a personal computer (PC). Such a signal is provided to processing circuitry 50 of FIG. 3. In even another embodiment, some or all of the above-described trigger events may be utilized in combination in the disk drive.

Figure 13:
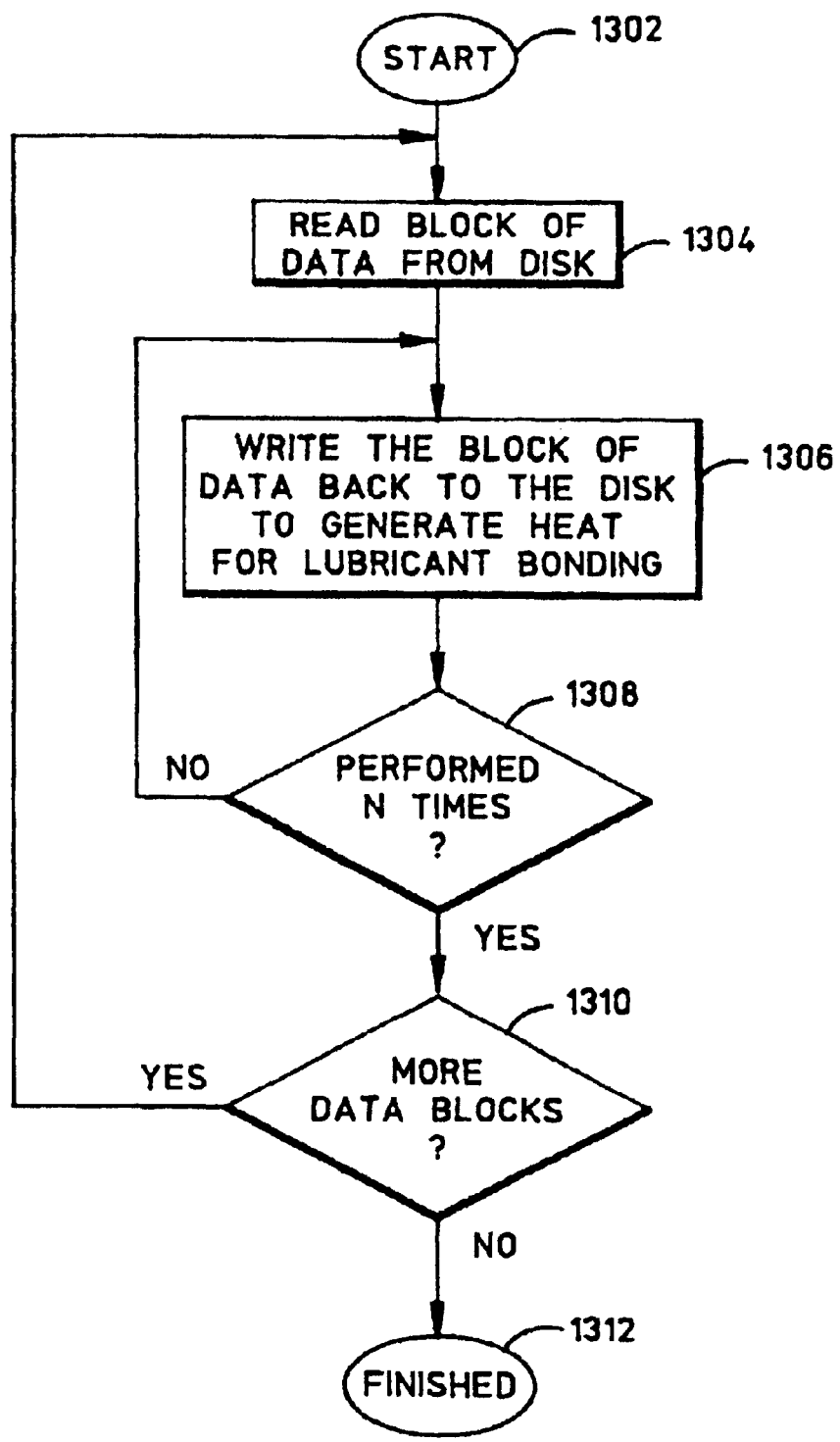
FIG. 13 is a flowchart which describes a method of performing lubricant bonding on a disk by repetitively writing data to the disk.

Lubricant Bonding by Repetitive Writing to the Magnetic Disk. Sufficient heat may be produced for lubricant bonding by repetitively writing data to the magnetic disk. This does not require any new elements in the magnetic head or the disk drive other than modified software control. FIG. 13 is a flowchart which describes an example of such a method.

This technique is performed by processing circuitry in the disk drive which may include memory or a data storage medium (e.g. ROM, EEPROM, or Flash memory) for storing computer instructions which execute the technique with a controller or processor (e.g. a microprocessor).

Beginning at a start block 1302 of FIG. 13, the disk drive enters into a lubricant bonding mode of operation (e.g. step 1212 of FIG. 12). The disk drive controls the magnetic head to read a block of data from the disk and stores this data in memory of the disk drive (step 1304). This block of data may be any suitable length. For example, the data that is read and stored may be data from (at least) a single disk track. Next, the block of data is then written back to the disk at the same location (step 1306). So long as the number of write repetitions N has not been reached as tested in step 1308, this writing of data is continuously repeated at step 1306 at the same disk location to generate heat for lubricant bonding.

The number of write repetitions N at step 1308 may be determined in advance (e.g. empirically) in the design and/or manufacturing phase of the disk drive to correlate N with some predetermined temperature, temperature range, or temperature increase at the disk location. The number of write repetitions may vary from, for example, between 10–100; however it is understood that a larger number (e.g. 1000's) of write repetitions N may be required or perhaps even a smaller number. Alternatively, if real-time temperature is monitored at the disk location then the repetitive writing may terminate when the temperature reaches a predetermined threshold or a predetermined threshold over some predetermined time period. The number of N writing repetitions and/or the length of time it takes to perform the lubricant bonding depends on the size of the surface area of the disk to be repetitively written/bonded, the average temperature of the heat produced by the repetitive writing, and the average frequency at which the repetitive writing is performed. The average temperature of heat produced by the writing process may vary from between about 25–250° Celsius; however it is preferable to maintain the writing process at a relatively low temperature of between about 85–120° Celsius.

If the data has been written N times as tested in step 1308 (or another suitable signal has been detected), then the disk drive tests whether there are more disk locations/data blocks at which to perform lubricant bonding (step 1310). If there are an additional M disk locations at which to perform lubricant bonding at step 1310, then the technique repeats steps 1304–1308 at the new disk location M-1 more times. If there are no additional disk locations at which to perform lubricant bonding as tested at step 1310, then the lubricant bonding mode is completed and the flowchart ends at a finished block 1312.

In one example, the technique continually repeats from step 1310 so that the entire disk surface has been bonded. In another example, the technique continually repeats from step 1310 until at least 10% of the disk surface has been bonded. In even another example, the technique continually repeats from step 1310 so that at least a portion of the disk surface (e.g. the ID or OD) has been bonded. Today's magnetic disks are produced with between about 30,000–50,000 disk tracks so, if a single disk track is utilized for each write process in step 1306, then M additional disk locations may be on the order of (or exceed) 100, 1000, or 10,000 disk tracks.

Final Comments. Thus, methods and apparatus for thermally bonding lubricant to a surface of a magnetic disk in a disk drive have been described. One method involves providing a heat source at an air bearing surface (ABS) of a magnetic head; causing the heat source to be energized to produce heat; and causing the magnetic head to be moved across a surface portion of a magnetic disk so that lubricant is thermally bonded to the surface portion from the heat produced by the heat source. Preferably, the heat source comprises one or more pole pieces of the magnetic head. The one or more pole pieces may be coupled to a heater driver circuit through electrical conductors which provides an electrical current (AC or DC) therethrough for producing the heat. A computer program product of the present invention includes a data storage medium and computer instructions stored in the data storage medium which are executable on a processor for causing a heat source at an air bearing surface (ABS) of a magnetic head to be energized to produce heat; and causing the magnetic head to be moved across a surface portion of a magnetic disk so that lubricant is thermally bonded to the surface portion from the heat produced by the heat source. A disk drive of the present invention includes a housing; a magnetic disk rotatably supported in the housing; a magnetic head assembly which includes a magnetic head, a support mounted in the housing which supports the magnetic head assembly so as to be in a transducing relationship with the magnetic disk; a spindle motor which rotates the magnetic disk; an actuator positioning device connected to the support which moves the magnetic head assembly to multiple positions with respect to the magnetic disk; a processor connected to the magnetic head assembly and to the actuator, the processor being operative to exchange signals with and control the position of the magnetic head assembly, a heat source on the magnetic head assembly; and a driver circuit coupled to the heat source. The disk drive has a read/write mode of operation during which data is read from/written to the magnetic disk. The disk drive also has a lubricant bonding mode of operation during which the driver circuit is operative to cause the heat source to be heated and the processor is operative to control the position of the magnetic head assembly so the heat source heats a surface portion of the magnetic disk so that lubricant is bonded to the surface portion. Preferably, the heat source comprises one or more pole pieces of the magnetic head. The one or more pole pieces may be coupled to a heater driver circuit through electrical conductors which provides an electrical current (AC or DC) therethrough for producing the heat.

In other inventive aspects of the present application, a magnetic head includes first and second pole pieces; a write gap formed between the first and the second pole pieces; and a separate heating element formed in the magnetic head which produces heat at an air bearing surface (ABS) for thermally bonding lubricant over at least a portion of a surface of a magnetic disk. An associated method for this inventive aspect includes the acts of providing the heating element in the magnetic head; and controlling the magnetic head to move over at least a portion of a surface of a magnetic disk while the heating element is energized so that lubricant is thermally bonded to the at least portion of the surface of the magnetic disk. In a related inventive aspect, a magnetic head includes a write head; and a heat source at an air bearing surface (ABS) of the write head which is operative as both a thermal-assist heat source for use in writing data to a magnetic disk and a lubricant bonding heat source for use in thermally bonding lubricant to a surface of the magnetic disk. A method associated with this related inventive aspect involves the operation of a disk drive which has a magnetic head with a heat source at an air bearing surface (ABS). The method includes the acts of causing the disk drive to operate in a write mode of operation during which the magnetic head writes data to a magnetic disk and the heat source produces heat to assist in the writing of the data; and causing the disk drive to operate in a lubricant bonding mode of operation during which the magnetic head is moved across a surface portion of the magnetic disk to thermally bond lubricant to the surface portion from heat produced by the heat source.

In yet another inventive aspect of the present application, a method for operating a disk drive in a lubricant bonding mode involves the acts of reading data from a data block of the magnetic disk; storing the data in memory; and repeatedly writing the data back to the data block of the magnetic disk a plurality of N times to generate heat for thermally bonding lubricant over the magnetic disk. A computer program product corresponding to this inventive aspect includes a data storage medium and computer instructions stored on the data storage medium which are executable by a processor of a disk drive for thermally bonding lubricant over at least a portion of a surface of a magnetic disk by reading data from a data block of the magnetic disk; storing the data in memory; and repeatedly writing the data back to the data block of the magnetic disk a plurality of N times to generate heat for thermally bonding lubricant over the magnetic disk A disk drive which incorporates this inventive aspect includes a housing; a magnetic disk rotatably supported in the housing; a magnetic head assembly which includes a magnetic head; a support mounted in the housing which supports the magnetic head assembly so as to be in a transducing relationship with the magnetic disk; a spindle motor which rotates the magnetic disk; an actuator positioning device connected to the support which moves the magnetic head assembly to multiple positions with respect to the magnetic disk; a processor connected to the magnetic head assembly and to the actuator; the processor being operative to exchange signals with and control the position of the magnetic head assembly; the processor being further operative to, during a lubricant bonding mode of operation: cause the magnetic head assembly to read data from a data block of the magnetic disk and store it into memory, and cause the magnetic head assembly to repeatedly write the data back to the data block of the magnetic disk a plurality of N times to generate heat for thermally bonding lubricant over the magnetic disk.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method for use in thermally bonding lubricant over at least a portion of a surface of a magnetic disk, comprising:
    during a lubricant bonding mode of operation:
        reading data from a data block of the magnetic disk;
        storing the data in memory; and
        repeatedly writing the data back to the data block of the magnetic disk a plurality of N times to generate heat for thermally bonding lubricant over the magnetic disk.

2. The method of claim 1, further comprising:
    repeating the repetitive writing of data for an additional data block of the magnetic disk.

3. The method of claim 1, further comprising:
    repeating the repetitive writing of data for a plurality of additional data blocks of the magnetic disk.

4. The method of claim 1, further comprising:
    repeating the repetitive writing of data for a plurality of additional data blocks of the magnetic disk for thermally bonding lubricant over the at least portion of the surface of the magnetic disk.

5. The method of claim 1, further comprising:
    repeating the repetitive writing of data for a plurality of additional data blocks of the magnetic disk for thermally bonding lubricant over the at least portion of the surface of the magnetic disk; and
    wherein the at least portion of the surface comprises an inner diameter (ID) or an outer diameter (OD) of the magnetic disk.

6. The method of claim 1, wherein the data block comprises at least one disk track of the magnetic disk.

7. The method of claim 1, wherein $N \geq 10$.

8. The method of claim 1, wherein $N \geq 100$.

9. A computer program product, comprising:
    a data storage medium,
    computer instructions stored on the data storage medium;
    the computer instructions being executable by a processor of a disk drive for thermally bonding lubricant over at least a portion of a surface of a magnetic disk by:
        reading data from a data block of the magnetic disk;
        storing the data in memory; and
        repeatedly writing the data back to the data block of the magnetic disk a plurality of N times to generate heat for thermally bonding lubricant over the magnetic disk.

10. The computer program product of claim 9, wherein the computer instructions are further executable for:
    repeating the repetitive writing of data for an additional data block of the magnetic disk.

11. The computer program product of claim 9, wherein the computer instructions are further executable for:
    repeating the repetitive writing of data for a plurality of additional data blocks of the magnetic disk.

12. The computer program product of claim 9, wherein the computer instructions are further executable for:
    repeating the repetitive writing of data for a plurality of additional data blocks of the magnetic disk for thermally bonding lubricant over the at least portion of the surface of the magnetic disk.

13. The computer program product of claim 9, wherein the computer instructions are further executable for:
    repeating the repetitive writing of data for a plurality of additional data blocks of the magnetic disk for thermally bonding lubricant over the at least portion of the surface of the magnetic disk; and
    wherein the at least portion of the surface comprises an inner diameter (ID) or an outer diameter (OD) of the magnetic disk.

14. The computer program product of claim 9, wherein the data block comprises at least one disk track of the magnetic disk.

15. The computer program product of claim 9, wherein $N \geq 10$.

16. The computer program product of claim 9, wherein $N \geq 100$.

17. A disk drive, comprising:
    a housing;
    a magnetic disk rotatably supported in the housing;

a magnetic head assembly which includes a magnetic head;

a support mounted in the housing which supports the magnetic head assembly so as to be in a transducing relationship with the magnetic disk;

a spindle motor which rotates the magnetic disk;

an actuator positioning device connected to the support which moves the magnetic head assembly to multiple positions with respect to the magnetic disk;

a processor connected to the magnetic head assembly and to the actuator;

the processor being operative to exchange signals with and control the position of the magnetic head assembly;

the processor being operative to, during a lubricant bonding mode of operation:

cause the magnetic head assembly to read data from a data block of the magnetic disk and store it into memory; and cause the magnetic head assembly to repeatedly write the data back to the data block of the magnetic disk a plurality of N times to generate heat for thermally bonding lubricant over the magnetic disk.

18. The disk drive of claim 17 wherein, during the lubricant bonding mode of operation, the processor further causes the magnetic head assembly to repeat the repetitive writing of data for an additional data block of the magnetic disk.

19. The disk drive of claim 17 wherein, during the lubricant bonding mode of operation, the processor further causes the magnetic head assembly to repeat the repetitive writing of data for a plurality of additional data blocks of the magnetic disk.

20. The disk drive of claim 17 wherein, during the lubricant bonding mode of operation, the processor further causes the magnetic head assembly to repeat the repetitive writing of data for a plurality of additional data blocks of the magnetic disk for thermally bonding lubricant over the at least portion of the surface of the magnetic disk.

21. The disk drive of claim 17 wherein, during the lubricant bonding mode of operation, the processor further causes the magnetic head assembly to repeat the repetitive writing of data for a plurality of additional data blocks of the magnetic disk for thermally bonding lubricant over the at least portion of the surface of the magnetic disk comprising an inner diameter (ID) or an outer diameter (OD) of the magnetic disk.

22. The disk drive of claim 17, wherein the data block comprises at least one disk track of the magnetic disk.

23. The disk drive of claim 17, wherein $N \geq 10$.

24. The disk drive of claim 17, wherein $N \geq 100$.

25. A method of thermally bonding lubricant over at least a portion of a surface of a magnetic disk comprising:

for each data block of a plurality of M data blocks of the magnetic disk corresponding to the at least portion of the surface of the magnetic disk:

reading data from the data block of the magnetic disk; and repeatedly writing the data back to the data block of the magnetic disk a plurality of N times to generate heat for thermal lubricant bonding.

26. The method of claim 25, wherein each data block comprises at least one data track of the magnetic disk.

27. The method of claim 25, wherein the at least portion of the surface of the magnetic disk comprises an inner diameter (ID) or an outer diameter (OD) of the magnetic disk.

28. The method of claim 25, wherein $N \geq 10$.

29. The method of claim 25, wherein $N \geq 100$.

30. The method of claim 25, wherein $M \geq 100$.

* * * * *

UNITED STATES PATENT AND TRADEMARK OFFICE
CERTIFICATE OF CORRECTION

PATENT NO. : 6,831,802 B1
DATED : September 30, 2003
INVENTOR(S) : Gillis et al.

It is certified that error appears in the above-identified patent and that said Letters Patent is hereby corrected as shown below:

Title page,
Item [73], Assignee, change "Hitachi Global Storage Technologies, Amsterdam (NL)" to
-- Hitachi Global Storage Technologies Netherlands B.V., Amsterdam (NL) --.

Signed and Sealed this

Eighth Day of November, 2005

JON W. DUDAS
*Director of the United States Patent and Trademark Office*